(12) United States Patent
Kothari et al.

(10) Patent No.: US 10,222,789 B2
(45) Date of Patent: Mar. 5, 2019

(54) SCHEDULING MANUFACTURING JOBS

(71) Applicant: Hewlett-Packard Development Company, L.P., Houston, TX (US)

(72) Inventors: Sunil Kothari, Palo Alto, CA (US); Thomas J Peck, Corvallis, OR (US); Gene Allen McDaniel, Jr., Palo Alto, CA (US); Jun Zeng, Palo Alto, CA (US); Gary J Dispoto, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 69 days.

(21) Appl. No.: 15/307,748

(22) PCT Filed: Apr. 30, 2014

(86) PCT No.: PCT/US2014/036039
§ 371 (c)(1),
(2) Date: Oct. 28, 2016

(87) PCT Pub. No.: WO2015/167491
PCT Pub. Date: Nov. 5, 2015

(65) Prior Publication Data
US 2017/0115659 A1    Apr. 27, 2017

(51) Int. Cl.
*G05B 19/418* (2006.01)
*G06Q 10/06* (2012.01)
(Continued)

(52) U.S. Cl.
CPC . *G05B 19/41865* (2013.01); *G06Q 10/06311* (2013.01); *G06Q 10/109* (2013.01);
(Continued)

(58) Field of Classification Search
CPC .............. G05B 19/41865; G05B 2219/25419
See application file for complete search history.

(56) References Cited

U.S. PATENT DOCUMENTS

| 6,088,626 A | 7/2000 | Lilly et al. |
| 7,503,555 B2 | 3/2009 | Dobrovolsky |

(Continued)

FOREIGN PATENT DOCUMENTS

WO    WO 2012128746 A1 *  9/2012  ........... G06F 3/1204

OTHER PUBLICATIONS

Bindrite.com "Fully Automatic Punching Systems with Digital or Manual Format Adjustment", Jul. 1, 2009.

*Primary Examiner* — Yuhui R Pan
(74) *Attorney, Agent, or Firm* — HP Inc. Patent Department

(57) ABSTRACT

Scheduling of manufacturing jobs is described herein. In accordance with an example, the scheduling of manufacturing jobs includes obtaining an order parameter associated with a product to be manufactured on a manufacturing equipment set. A product dimension of an intermediate product for the product is determined based on the order parameter and a production attribute. Further, the manufacturing job is scheduled for the product amongst manufacturing jobs for other products to be manufactured on the manufacturing equipment set, based on the product dimension of the intermediate product and a scheduling criterion. The scheduling criterion can be a parameter to regulate the scheduling of the manufacturing jobs on the manufacturing equipment set.

12 Claims, 5 Drawing Sheets

(51) Int. Cl.
*G06Q 10/10* (2012.01)
*G06Q 10/00* (2012.01)

(52) U.S. Cl.
CPC ... *G06Q 10/20* (2013.01); *G05B 2219/25419* (2013.01); *Y02P 90/86* (2015.11)

(56) References Cited

U.S. PATENT DOCUMENTS

| | | |
|---|---|---|
| 7,542,161 B2 | 6/2009 | Lin et al. |
| 2002/0107600 A1* | 8/2002 | Crampton .............. G06Q 10/06 700/100 |
| 2002/0188514 A1 | 12/2002 | Kritt |
| 2006/0167577 A1 | 7/2006 | Clark et al. |
| 2008/0080006 A1 | 4/2008 | Paskalev et al. |
| 2008/0144081 A1* | 6/2008 | Morales ............. G03G 15/5083 358/1.15 |
| 2010/0252979 A1* | 10/2010 | Powers .................. B42C 19/02 270/1.01 |
| 2013/0024311 A1 | 1/2013 | Knodt |
| 2014/0002528 A1 | 1/2014 | Allred et al. |

* cited by examiner

SCHEDULING MANUFACTURING JOBS

BACKGROUND

With increasing competition amongst product manufacturers and service providers, organizations are increasingly customizing products and services made available to consumers. For example, customization details, such as dimensions, colour, and shape, for a product may be obtained from each consumer, and the product may be customized for manufacture based on such details.

BRIEF DESCRIPTION OF FIGURES

The detailed description is provided with reference to the accompanying figures. In the figures, the left-most digit(s) of a reference number identifies the figure in which the reference number first appears. The same numbers are used throughout the figures to reference like features and components.

DETAILED DESCRIPTION

Figure 1A:
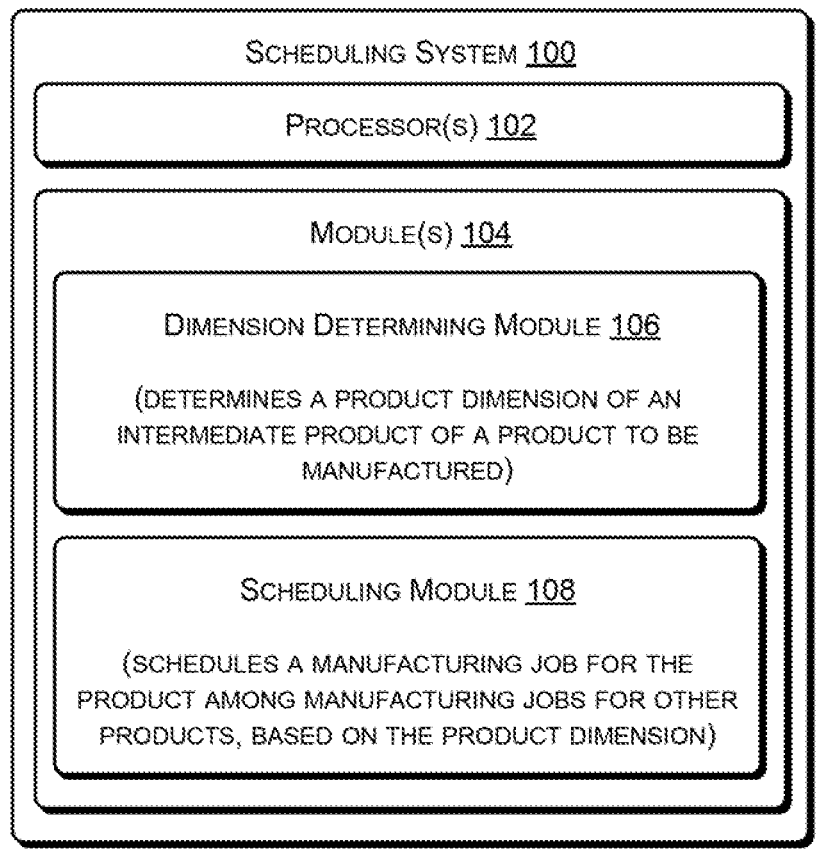
FIG. 1A illustrates a schematic of a scheduling system for scheduling manufacturing jobs, according to an example of the present subject matter.

Generally, manufacturing equipment and facilities are adapted for mass production; however, to cater to production based on the concept of customization, the same manufacturing equipment may be used for manufacturing singular customized products. For example, a customer may place an order for a book that is customized, i.e., printed and bound, as per the customer's specifications. In another example, a customer may look for a customized watch or for customized industrial products, such as spare parts. In one example, mass customization may be performed using 3-dimensional printing.

In such cases, when the existing manufacturing equipment is used for production, the production of each product customized differently may reduce productivity. For instance, consider a case where two products, such as books of different sizes, are to be bound or finished using the same finishing equipment. In such a case, when the first book is finished, the finishing equipment may have to be setup again for finishing or binding the second book, owing to the different size of the second book. As a result, the overall non-productive time of the manufacturing equipment can be substantially high. Accordingly, if a large number of such customized products are to be manufactured using the same equipment, various factors, such as setup times, processing times, and process flows, for each product, may come into play and may hamper the overall productivity of the manufacturing equipment. In addition, setting up of one production stage during manufacturing may affect the performance of the production stages downstream to that production stage, since the subsequent stages have to wait while the setting of the previous stage is being changed.

Generally, in such cases, the production processes are scheduled based on different parameters, such as specification or dimensions, associated with the finished product. However, the queuing of tasks in a schedule may be complicated because of the various stages of production involved in the manufacturing of the product. For instance, in the case of finishing of a book, a cutter, a trimmer, and a punch can be used at different stages. In one example, the input and output product from each stage may be dimensionally different. As the dimensions of the book changes from one stage to the other and additionally, the overall dimensions of the different books being manufactured change, the specification of the finished product may not be sufficient for scheduling of tasks, for example, for reducing the setup time. Such a situation further complicates the scheduling of tasks. Consequently, the scheduling techniques generally used may not be effective in achieving good productivity while manufacturing such customized goods.

The present subject matter provides an automated approach for scheduling and planning manufacturing processes for manufacturing products. In an example, the products can include customizable products; thus, some of the products being dimensionally different from the others. The products can range from small consumer goods, such as watches, books, calendars, and posters, to large consumer goods, such as vehicles, and can also include industrial goods, such as spare parts.

The manufacturing processes may be performed on a manufacturing equipment set. A manufacturing equipment set can be a complete production line including various machines and equipment which are used in the production of the products. For example, in case the products are printed paper products, the manufacturing equipment set can include finishing equipment, for instance, having integrated stages, or integrated printing and finishing equipment.

According to an aspect of the subject matter, a processor, for example, of a computing system, can plan scheduling of manufacturing jobs for a plurality of manufacturing equipment sets, and can select one of the manufacturing equipment sets from among the plurality of manufacturing equipment sets for manufacturing. Therefore, the present subject matter provides for automated optimized planning of manufacturing processes by selecting the manufacturing equipment set which allows for relatively higher performance and/or productivity.

According to another aspect, the processor can achieve scheduling for a manufacturing equipment set at run-time for queuing of manufacturing jobs in real-time. Accordingly, as a manufacturing job is received, the processor can reshuffle the manufacturing jobs already scheduled on the manufacturing equipment set to accommodate the received manufacturing job on the manufacturing equipment set, for example, for higher productivity. In such a case, the present subject matter can facilitate in optimized real-time scheduling of the tasks for achieving high productivity on the manufacturing equipment set during manufacturing.

For the purpose of scheduling, the processor obtains an order parameter(s) associated with a product to be manufactured. The order parameters can be parameters associated with a manufacturing job and can include, for example, specification of the finished product to be manufactured. For instance, in case the product is a book or a calendar, the specification can include length, thickness, and number of pages. In another instance, in case the product is a car, the specification can include dimensions of the doors, the hood, the roof, and the chassis.

Further, on the basis of the order parameters and production attributes, the processor can estimate a product dimension of an intermediate product associated with the product. In an example, the production attributes can be characteristic features of the manufacturing equipment set and the product to be manufactured and can include equipment specification, product type to be manufactured, and manufacturing processes to be used for manufacturing the product. An intermediate product can be a product obtained at an intermediate stage of production and can affect the utilization of the manufacturing equipment set in the manufacturing process. The product dimensions of the intermediate product can vary based on the product, the manufacturing process, and the manufacturing equipment set. In an example, the product dimensions of the intermediate product can affect the overall productivity of the manufacturing equipment set.

According to one aspect, the present subject matter involves the identification of a factor affecting the productivity of the manufacturing equipment set, determining the manner in which the factor affects production, and scheduling the tasks based on the factor, to optimize the effect on production for achieving high productivity. For example, the factor can be the product dimension of the intermediate product at an intermediate stage that could affect the productivity of the manufacturing equipment set.

In addition, the processor can obtain a scheduling criterion, for instance, from a user, on the basis of which the manufacturing jobs can be scheduled. In an example, the scheduling criterion can be, a parameter based on which the scheduling, and therefore, the manufacturing of products is to be optimized. For instance, the scheduling criterion can include the setup time for the equipment, the processing time for manufacturing the product on that equipment, the deadline for delivering the product, or a combination thereof. In case the setup time is the scheduling criterion, the processor can schedule the manufacturing jobs to minimize the setup times while manufacturing the products. In another case where the deadline for delivery is the scheduling criterion, the processor can schedule the manufacturing jobs in order to meet the deadlines. Therefore, based on the product dimension of the intermediate product and the scheduling criterion, the processor can optimally schedule the manufacturing job for the product along with the other products scheduled for production on the manufacturing equipment set.

Further, in an example as explained above, where one manufacturing equipment set is selected from among the plurality of manufacturing equipment sets, performance of each manufacturing equipment set under consideration can be estimated based on the scheduling plan. For instance, the processor can estimate the performance of each manufacturing equipment set in terms of production performance and financial performance. Accordingly, the processor can select a manufacturing equipment set for manufacturing, for example, based on the production performance or financial performance or both.

The present subject matter facilitates in achieving high productivity from the manufacturing equipment and substantially minimizing the non-productive time, thereby reducing non-utilization of manufacturing capability of the manufacturing equipment set. In addition, the present subject matter can provide for real-time scheduling as well as for selecting a manufacturing equipment set from a lot and for planning of production, in an optimized manner.

The above systems and methods are further described in the figures and associated description below. It should be noted that the description and figures merely illustrate the principles of the present subject matter. Therefore, various arrangements that embody the principles of the present subject matter, although not explicitly described or shown herein, can be devised from the description and are included within its scope.

FIG. 1A illustrates components of a scheduling system 100, according to an example of the present subject matter. The scheduling system 100 may include, for example, a processor 102 and modules 104 communicatively coupled to the processor 102. The processor 102 may include microprocessors, microcomputers, microcontrollers, digital signal processors, central processing units, state machines, logic circuitries, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

The modules 104, amongst other things, include routines, programs, objects, components, and data structures, which perform particular tasks or implement particular abstract data types. The modules 104 may also be implemented as, signal processor(s), state machine(s), logic circuitries, and/or any other device or component that manipulates signals based on operational instructions. Further, the modules 104 can be implemented by hardware, by computer-readable instructions executed by a processing unit, or by a combination thereof. The modules 104 can include a dimension determining module 106 and a scheduling module 108.

According to an aspect, the scheduling system 100 can provide for scheduling and planning of manufacturing processes for optimized manufacturing of products, for example, on a manufacturing equipment set(s). In one example, the scheduling system 100 may be used for optimized manufacturing of products, which are produced as customized products. A manufacturing equipment set can be a complete production line having various machines and equipment, also referred to as stages, which are used in the production of the products. For example, in case the products are printed paper products, the manufacturing equipment set can include finishing equipment, for instance, having integrated stages, or integrated printing and finishing equipment each having integrated stages. In another example, where the products are 3-dimensional printed products, the manufacturing equipment set can include printing equipment having integrated stages of additive processes, or the printing equipment integrated to the finishing equipment, either one or both having integrated stages. In some cases, the manufacturing equipment set can be a near-line equipment set, i.e., one machine may not be directly connected to another machine in the manufacturing equipment set, but may be placed in the vicinity.

According to an aspect, the scheduling system 100 identifies a factor affecting the production of products based on the manufacturing equipment set to be used for production. Further, the scheduling system 100 can determine the effect of the factor on the production and can plan a sequence of manufacturing jobs based on the factor, to optimize the production. In one example, the factor can be an intermediate stage of the manufacturing equipment set which affects the production, and a product dimension of an intermediate product obtained from the intermediate stage. The intermediate product can be an output from an intermediate stage of production and can affect the overall process of manufacturing of the product. Such an intermediate product may vary based on the product, the manufacturing process, and the manufacturing equipment set. For example, for a finishing equipment, such as a perfect binder, a book with the pages bound to a cover but not trimmed can be viewed as the intermediate product, since the dimensions of the book at such a stage determines whether later stages of the finishing equipment involve re-setting or not.

In an example, during operation of the scheduling system 100, the dimension determining module 106 determines the product dimension of an intermediate product of the product to be manufactured on the manufacturing equipment set, based on an order parameter and a production attribute. The production attribute can be the characteristic features associated with the entities affecting production and can include the manufacturing equipment and the product. Further, in an example, the order parameters can be the details received from the customer regarding customization of the product, such as dimensional specification of the product.

Further, the scheduling module 108 schedules manufacturing jobs for the product on the manufacturing equipment set, based on the product dimension of the intermediate product and a scheduling criterion. The scheduling criterion can be a parameter based on which the scheduling and manufacturing of the products is to be achieved. In an example, the scheduling criterion can be selected for achieving optimized manufacturing of the products and can include, for example, setup time, processing time, and a deadline for manufacturing the products. The various components of the scheduling system 100 are described in detail in conjunction with FIG. 1B.

Figure 1B:
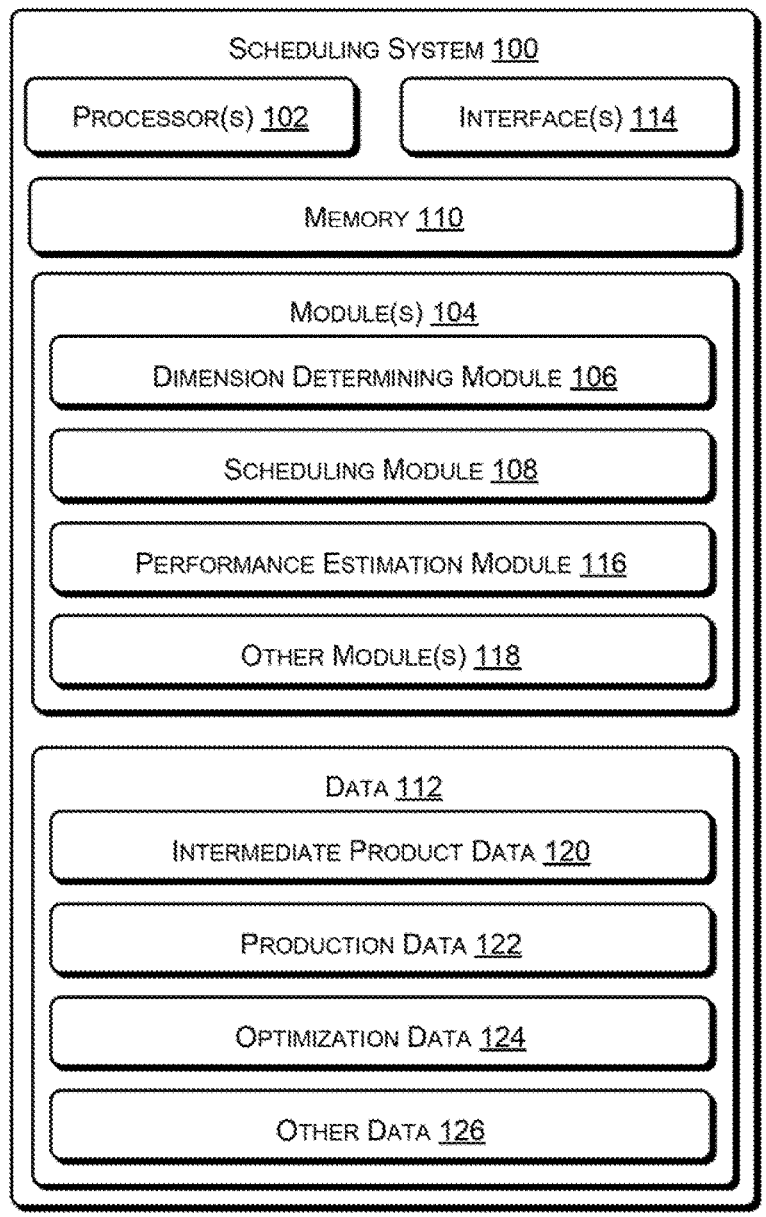
FIG. 1B illustrates a detailed schematic of the scheduling system for scheduling manufacturing jobs, according to an example of the present subject matter.

FIG. 1B illustrates a schematic of the scheduling system 100 showing various components thereof, according to an example of the present subject matter. The scheduling system 100, among other things, may include the processor 102, modules 104, a memory 110, data 112, and interface(s) 114. The processor 102, among other capabilities, may fetch and execute computer-readable instructions stored in the memory 110. The memory 110, communicatively coupled to the processor 102, can include a non-transitory computer-readable medium including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes.

The interfaces 114 may include a variety of commercially available interfaces, for example, interfaces for peripheral device(s), such as data input output devices, referred to as I/O devices, storage devices, network devices, and intermediate power devices. The interfaces 114 may facilitate multiple communications within a wide variety of networks and protocol types, including wired networks and wireless networks.

As mentioned earlier, the scheduling system 100 may include the modules 104. In an example, in addition to the dimension determining module 106 and the scheduling module 108, the modules 104 can include a performance estimation module 116 and other module(s) 118. The other module(s) 118 may include computer-readable instructions that supplement applications or functions performed by the scheduling system 100.

Further, the data 112 can include intermediate product data 120, production data 122, optimization data 124, and other data 126. The other data 126 may include data generated and saved by the modules 104 for providing various functionalities to the scheduling system 100.

As explained above, the scheduling system 100 can achieve scheduling and planning of manufacturing jobs for optimized productivity. In one example, the scheduling system 100 can achieve the scheduling of jobs in real-time for optimized utilization of the manufacturing equipment set. In another example, the scheduling system 100 can provide for planning of the manufacturing jobs for a plurality of manufacturing equipment sets. In the latter case, the scheduling system 100 can determine a scheduling plan for each of the manufacturing equipment sets for a predetermined batch of products, assess the overall performance of each manufacturing equipment set, and select one of the manufacturing equipment sets for the manufacturing jobs based on the overall performance. As mentioned previously, the manufacturing equipment set(s) cater to production of products and each product is customizable based on, for example, customer demand. Thus, in one case, each product manufactured on a manufacturing equipment set may be dimensionally different. In another case, batches of customized products may be produced on the manufacturing equipment set.

Further, as mentioned previously, for scheduling the jobs, the scheduling system 100 can identify the intermediate stage and determine the product dimension of the intermediate product in that stage, both affecting the production of products based on the manufacturing equipment set being used. The scheduling system 100 determines the effect of the intermediate stage and the product therefrom on production and, accordingly, plans a sequence of manufacturing jobs.

For example, in case of a car being manufactured as per customization demand of the customer, dimensions of the doors of the car and dimensions of the chassis can be the product dimensions of the intermediate product which can influence the productivity. In such a case, the scheduling system 100 can schedule the jobs based on the above identified factors and a previously specified scheduling criterion. In an example, the scheduling criterion can be a parameter determining a manner in which the manufacturing jobs are to be scheduled on the manufacturing equipment set. For instance, setup time involved in setting up various machines or stages in the manufacturing equipment set can be the scheduling criterion. In such a case, the scheduling system 100 can schedule the manufacturing jobs to optimize the setup times while manufacturing the products on the manufacturing equipment set. In another case, a deadline by which the products are to be manufactured on the manufacturing equipment set can be the scheduling criterion. Therefore, the scheduling criterion can regulate the manner in which the scheduling system 100 queues the manufacturing jobs.

Consider the case in which the scheduling system 100 selects a manufacturing equipment set from a plurality of manufacturing equipment sets for optimized production. In said case, according to an aspect, the dimension determining module 106 can obtain production attributes associated with each manufacturing equipment set and the products to be manufactured thereon. Based on the production attributes, the dimension determining module 106 can determine an intermediate product expression for each manufacturing equipment set. The intermediate product expression can, in turn, be used for determining the product dimension of the intermediate product.

According to an aspect, the dimension determining module 106 can take into account a relationship between outputs from and inputs to each stage of the manufacturing equipment set. Based on the relationship, the dimension determining module 106 can identify the intermediate stage which can affect the overall manufacturing from the manufacturing equipment set. Accordingly, based on the identified intermediate stage, the dimension determining module 106 can determine the intermediate product expression for the manufacturing equipment set.

In one example, the intermediate product expression can be a mathematical relation capturing a correlation between various production attributes and indicating the dependence of the intermediate product on the production attributes. As will be discussed later, based on the intermediate product expression, the dimension determining module 106 can determine the product dimension of the intermediate product of the product to be manufactured. The dimension determining module 106 can store the intermediate product expression in the intermediate product data 120.

In an example, the production attributes associated with each manufacturing equipment set can be previously stored in the production data 122 and the dimension determining module 106 can determine the production attributes therefrom. In another case, the dimension determining module 106 can request a user to provide the production attributes associated with each of the manufacturing equipment sets and store the same in the production data 122. For instance, the production attributes can include equipment specification, a process flow on the manufacturing equipment set, and a product type to be manufactured. In an example, the equipment specification can include a set of equipment capabilities, a set of equipment inputs/outputs, operating modes, and equipment settings.

Consider an example in which the products to be manufactured are books having different specification, such as dimensions and number of pages. In such a case, the equipment capabilities can indicate the dimensions of the book that the manufacturing equipment set and each stage or machine in the manufacturing equipment set can handle. In an example, the equipment capabilities can be expressed as attribute-value pairs qualified by the equipment name and the product name. For instance, a book-cover printer, referred to as "cover printer A" to which a substrate roll is fed for printing can have the following equipment capability:
{brand="cover printer A", attr="web_width_min", mode="none", value=5*inch}.

This implies that for cover printer A, the minimum width of the web is 5 inches. Similarly, cover printer A can have the following equipment capabilities provided as examples:
{brand="cover printer A", attr="web_width_max", mode="none", value=60*inch},
{brand="cover printer A", attr="coated_media_weight_min", mode="none", value=55*gsm},
{brand="cover printer A", attr="coated_media_weight_max", mode="none", value=130*gsm},
{brand="cover printer A", attr="uncoated_media_weightmin", mode="none", value=40*gsm},
{brand="cover printer A", attr="uncoated_media_weight_max", mode="none", value=130*gsm}.

In another example, a printer B which is fed sheets for printing can have the capability as follows:
{brand="printer B", attr="feederdrawer1", mode="none", value=1800*A4sheets}, Which implies that a feed drawer of the printer B can house 1800 A4 sheets.

In addition, as mentioned above, each machine or stage in each manufacturing equipment set can have the set of equipment inputs/outputs associated therewith. In one example, the inputs and outputs associated with the equipment forming part of the manufacturing equipment set can be provided with respect to a certain product or a manufacturing process flow. In said example, the inputs to the equipment can include inputs from other equipment or a consumable, such as substrate, ink, paint, or oil. The equipment inputs/outputs can be provided as attribute-value pairs, in the same manner as the equipment specification. For instance, in case of a printing equipment "XYZ", the equipment input and output sets, as examples, can be as follows:
inputs={num=2, input0={name="CoverSheets", index="input0", ptr="substrates", process="none", resource="A3_Sheets", ref="none"}, input1={name="RippedCover", index="input1", ptr="processCapabilities", process="RIP_Cover", resource="XYZ", ref="output0"}}
outputs={num=1, output0={name="PrintedRippedCover", ptr="none", index="output0", id="none", ptr="none", ref="none"}}

In the above example of the equipment input/outputs, the input set includes that the input to the printing equipment "XYZ" is cover sheets, A3 sheets and a ripped cover of the book, and the output is a printed ripped cover of the book. As can be seen from the above example, the "ptr" attribute indicates whether a given input to a machine of the manufacturing equipment set is a substrate or not. A populated value of "substrates" in the "ptr" attributes denotes that the substrate is being referred to in the equipment input and output sets. Further, the actual substrate is indexed by a value of the "resource" attribute value which in the above example is "A3_sheets". Similarly, a value of the "processCapabilties" denotes a process is being referred to in the equipment input and output sets. The actual process is denoted by the value of the "process" attribute, the value in the above example being "RIP_Cover".

Further, the equipment specification can include different modes in which the equipment of each manufacturing equipment set can operate, referred to as operating modes of the equipment or machine. The operating modes can be selected based on an input, for instance, by a user, or based on previously stored operating policies. Such operating policies can be stored in the production data 122. Additionally, in an example, the equipment capabilities can be dependent on the operating mode that the equipment is selected to operate in.

For example, in case of a paper printing equipment, such as cover printer A, production can be dependent on the whether the printer is operating in "color", "economy", or "monochrome" mode. Accordingly, in certain cases, the production attributes may be dependent on each other. Therefore, in one example, the operating mode can be provided as a combination of capability attribute and value pair for a give operating mode. For instance, the operating mode for cover printer A can be as follows:
{brand="cover printer A", attr="throughput_max", mode="color", value="120*A4sheets/min"}

The above expression for the operating mode of cover printer A denotes that the maximum throughput of cover printer A in colour mode on A4 sheets is 120 sheets per minute. Similarly, other the operating modes for cover printer A, as examples, can be as follows:
{brand="cover printer A", attr="throughput_min", mode="economy", value="0*A4sheets/min"}, {brand="cover printer A", attr="throughput_max", mode="economy", value="160*A4sheets/min"},
{brand="cover printer A", attr="throughput_min", mode="mono", value="0*A4sheets/min"},
{brand="cover printer A", attr="throughput_max", mode="mono", value="240*A4sheets/min"}.

In addition, the equipment specification can include the equipment settings for the equipment in each manufacturing equipment set. The equipment settings can be based on, for example, the product to be manufactured. In an example, the equipment settings can include operational policies, such as queue lengths and batching parameters dictating batch sizes. For instance, whether the manufacturing jobs are to be scheduled in a round robin manner can be part of the operational policies. Since the equipment can have different settings based on different products, each equipment setting can be qualified by the product. In an example, a printing press, referred to as "printing press B" can have the following equipment settings with reference to the substrate used for printing. For a book, the equipment setting can be:

"printing press
 $B\_input0\_media\_coated==False \Rightarrow$ printing press
 $B\_production\_speed=300$ feet/min" (I)

Expression (I) for the equipment setting for printing press B implies that when printing press B is used for printing a book which does not use a coated substrate, then the production speed or the printing speed can be of about 300 feet per minute. On the other hand, for a photo album, the equipment setting can be:

"printing press
 $B\_input0\_media\_coated==True \Rightarrow$ printing press
 $B\_production\_speed=200$ feet/min" (II)

Expression (II) for the equipment setting for printing press B implies that when printing press B is used for printing a photo album which uses a coated substrate, then the printing speed of printing press B can be of about 200 feet per minute. Accordingly, in one instance, the substrate type can also be part of the equipment settings.

In addition, as part of the production attributes, the dimension determining module 106 can obtain the process flow to be used for manufacturing on each manufacturing equipment set. For example, in case of a book binding technique on a binder equipment set, the process flow can include obtaining the book block and the cover as an input at the book binder where the book is bound and the cover glued to the book; then providing the bound book and glued cover to a three-knife trimmer; the output from the three-knife trimmer can be provided to a three-hole punch; and the output from the three-hole punch can be provided to a fulfillment equipment from which the final finished and bound book is obtained.

Further, as mentioned previously, as part of operation of the scheduling system 100, the dimension determining module 106 determines the intermediate product expression for each of the manufacturing equipment sets based on the above mentioned product attributes, once the production attributes are received. As described previously, the intermediate product expression can denote the relationship between various production attributes and dependence of the dimensions of the intermediate product on the production attributes. In turn, in an example, the intermediate product expression for each manufacturing equipment set can capture the effect of various production attributes on the product dimensions of the intermediate product of the product to be manufactured.

As part of determining the intermediate product expression, in one example, the dimension determining module 106 can take into account product transformations indicative of relationship between the outputs from and the inputs to each machine. For instance, the outputs from a machine may be input to another machine and the product transformation may depict the manner in which physical attributes of the input can be transformed for obtaining the output. In other words, the product transformations indicate the effect of the stage or equipment in which the transformations occur on the manufacturing process for manufacturing the products, for example, in terms of the setup time or the processing time or any other such criteria. Considering the example of a book binder, the input to the book binder can be a cover and a book block and the output can be a bound book with cover glued to the book. In such a case, the product transformations may depict the manner in which height, width, and thickness of the book block can be transformed for obtaining the bound book as the output.

According to an aspect, based on the product transformation, the dimension determining module 106 can identify the intermediate stage which can affect the overall manufacturing from the manufacturing equipment set. In said example, the dimension determining module 106 can determine the intermediate product of the identified intermediate stage, and based on the intermediate product, the dimension determining module 106 can determine the intermediate product expression for the manufacturing equipment set.

Taking the above mentioned example of the book binder, the intermediate product expression in such a case can be as follows:

"book binder_output0_length=max (book binder_input0_length, book binder_input1_length)", Where input0 refers to the cover and input1 refers to the book block. The above expression implies that the maximum output length of the bound book from the book binder can be the maximum of either the length of the book block or that of the cover. Similarly, in another example, the product transformation can be "book binder_output0_thickness=2*book binder_input0_thickness+book binder_input1_thickness", Where input0 refers to the cover and input1 refers to the book block. In said expression, the maximum thickness of the bound book obtained as output from the book binder can be a sum of the thickness of the book block and twice the thickness of the book cover.

Consider another example in which the manufacturing equipment set includes a binder "ABC" and the dimension determining module 106 identifies that the material entering and exiting from the binder is the intermediate product or the manufacturing equipment set. For example, the book block and the book cover can enter binder ABC and the bound book block with cover pasted to the book block can be obtained as output. In such a case, the dimension determining module 106 can determine the intermediate product expressions to be as follows:

$ABC\_output0\_thickness = ABC\_input0\_thickness*2 + ABC\_input1\_thickness$ (1)

$ABC\_ouput0\_width = max(ABC\_input0\_width, ABC\_input1\_width)$ (2)

$ABC\_ouput0\_height = max(ABC\_input0\_height, ABC\_input1\_height)$ (3)

In the above expressions (1), (2), and (3), where input0 can refer to the cover, input1 can refer to the book block, and output0 refers to the bound book block with pasted cover.

Expression (1) states that the thickness of the product coming out of binder ABC can be sum of the thickness of the book block and twice the thickness of the cover. Expression (2) states that the width of the product exiting binder ABC can be a maximum of width of the incoming cover and width of the book block width. Expression (3) states that the height of the product exiting binder ABC can be a maximum of height of the cover and that of the book block.

To determine the product dimensions of the intermediate products, the dimension determining module 106 can obtain an order parameter(s) associated with the product to be manufactured. As mentioned earlier, the order parameters can be the details received from the customer regarding customization of the product. For example, the order parameters can be dimensions of the finished product to be manufactured. Consider that the product being manufactured for a customer is a book. In such a case, as part of the order parameters, the dimension determining module 106 can determine from the customer the length, width, and thickness of the book. In another case, where the product being manufactured is a car, the order parameters can be the overall dimensions of the car including the length, wheel base, width, height, and ground clearance. In an example, the scheduling system 100 can be coupled to a plurality of customer devices (not shown) over a wired or wireless communication network to obtain the order parameters from the customers. The dimension determining module 106 can store the order parameters in the production data 122.

According to an aspect, based on the intermediate product expression and the order parameters, the dimension determining module 106 can determine the product dimension of the intermediate product of the product for which order parameters are received. In an example, while the product dimensions of the intermediate product may change for different products according to the order attributes associated with the respective products; however, the intermediate product expression is the same for the manufacturing equipment set, with respect to the production attributes, such as the equipment specification and the manufacturing process flows. In addition, the dimension determining module 106 can determine the product dimensions of the intermediate product of the product to be manufactured on each of the plurality of manufacturing equipment set.

As explained previously, the product dimension of the intermediate products can be the decisive factor which influences the productivity of each manufacturing equipment set. Accordingly, the scheduling module 108 can plan scheduling of the manufacturing jobs taking into account the product dimensions of the intermediate products. In an example, the scheduling module 108 can employ genetic optimization techniques, simulated annealing techniques or a combination of linear optimization approaches for scheduling the manufacturing jobs.

As explained above, the scheduling module 108 can obtain a scheduling criterion on the basis of which the scheduling of manufacturing job for the product can be done. The scheduling module 108 can reshuffle the manufacturing jobs already scheduled on the manufacturing equipment set to accommodate the received manufacturing job on the manufacturing equipment set, for example, for higher productivity. Further, the scheduling module 108 can schedule the manufacturing jobs for the other products in the same manner as described above, in order to obtain high productivity from the manufacturing equipment set. In an example, the scheduling criterion can be the setup time or the processing time which is to be optimized while manufacturing the products. In another case, the deadline to finish a product can be the scheduling criterion on the basis of which the scheduling module 108 can determine the queuing of manufacturing jobs. In certain other cases, the scheduling criterion can include periodic breaks for the manufacturing equipment set, for example, 15 minutes per 2 hours of operational time, a previously scheduled maintenance(s), or replenishment of consumables in the manufacturing equipment set, such as substrate or ink in case of book production, or paint in case of car production. In addition, the scheduling module 108 may take into account a single scheduling criterion or a combination of scheduling criteria for determining the scheduling of manufacturing jobs on the manufacturing equipment sets.

Further, in one case, the scheduling module 108 can determine the scheduling criterion from the user and may store the scheduling criterion in the optimization data 124. In another case, the scheduling criterion can be previously stored in the optimization data 124 and the scheduling module 108 can obtain the scheduling criterion from the optimization data 124.

To understand the operation of the scheduling module 108, consider that the scheduling module 108 plans queuing of jobs for each manufacturing equipment set to be used for printing books. In an example, the dimension determining module 106 identifies the binding equipment in one of the manufacturing equipment set to be the stage affecting production, and accordingly, the scheduling module 108 can schedule the jobs based on changes in the dimensions of the product received at and exiting the binding equipment. For example, to cater to the binding demand for an incoming product, the scheduling module 108 can take into account height and width of the incoming product. Further, based on the equipment specification, the height and width settings of the binding equipment can be adjusted sequentially or concurrently. In another case, the height and width adjustment can be customizable, for example, based on input from an operator. Accordingly, the scheduling module 108 can determine the setup times based on the following relations as examples:

$$T_{seq} = T_H + T_W$$

$$T_{con} = \text{Max}(T_H, T_W)$$

$$T_{cust} = 0.8 * T_H + 1.5 * T_W$$

In the above expressions, $T_H$ depicts the setup time for adjusting the height of the binding equipment; $T_W$ denotes the setup time for adjusting the width of the binding equipment; $T_{seq}$ denotes the setup time for sequentially adjusting the height and width of the binding equipment; $T_{con}$ depicts the setup time for concurrently adjusting the height and width of the binding equipment; and $T_{cust}$ depicts the setup time for adjusting the height and width of the binding equipment based on customized inputs.

In another instance, to cater to the demand of binding the incoming product, the height, width, and thickness settings of the binding equipment may have to be adjusted sequentially, concurrently, or based on customized inputs. In such a case, the scheduling module 108 can determine the setup times based on the following relations as examples:

$$T_{seq} = T_H + T_W + T_T$$

$$T_1 = \text{Max}(T_H + T_W, T_T)$$

$$T_2 = \text{Max}(T_H + T_W, 1.2 * T_W)$$

In the above expressions, $T_H$ depicts the setup time for adjusting the height of the binding equipment; $T_W$ denotes the setup time for adjusting the width of the binding equipment; $T_T$ denotes the setup time for adjusting the thickness of the binding equipment; $T_{seq}$ denotes the setup time for sequentially adjusting the height, width, and thickness of the binding equipment; $T_1$ depicts the setup time for sequentially adjusting the height and width, and concurrently adjusting the thickness of the binding equipment; and $T_2$ depicts the setup time for sequentially adjusting the height and width, and adjusting the thickness of the binding equipment based on customized inputs.

In an example, based on cumulative values of $T_{seq}$, $T_1$, and $T_2$ for various products to be manufactured, the scheduling module 108 can queue the manufacturing jobs. Based on the values of $T_{seq}$, $T_{con}$, and $T_{cust}$ for various products, the scheduling module 108 can achieve the scheduling of the jobs, for example, in order to optimize the overall setup time for the binding equipment.

For instance, while scheduling the manufacturing jobs, the scheduling module 108 can determine for the incoming product to be scheduled whether the setup will involve a change in height, width, thickness, or a combination thereof. Further, based on the equipment specification, the scheduling module 108 can determine whether the adjustments have to be made sequentially, concurrently, or based on customized inputs. For example, in case the equipment can be adjusted based on customized inputs, the scheduling module 108 can determine those products to be manufactured which involve customized adjustment.

Accordingly, based on the adjustment in the equipment and the manner of setup involved for the incoming products, the scheduling module 108 can determine the setup times, for example, in accordance with the above mentioned relations. Further, based on the setup time, the scheduling module 108 can plan queuing of the manufacturing jobs on each manufacturing equipment set.

Further, in certain cases, the scheduling module 108 can take into account a correlation between the scheduling criterion with the intermediate product expression while planning and scheduling the manufacturing jobs. As an example, the correlation between the scheduling criterion of setup time and changes in incoming product dimensions and outgoing product dimensions for different stages captured by the intermediate product expression as an example, is depicted in table 1 below, in case where the product is a book and the manufacturing process is book binding.

TABLE 1

| Process | Equipment | Incoming product dimensions (for books) and effect on setup time | | Outgoing product dimensions (for books) and effect on setup time | |
|---|---|---|---|---|---|
| | | Height and width | Thickness | Height and width | Thickness |
| RIP | RIP equipment | No | No | No | No |
| Page printing | Printer A | No | No | No | No |
| Cover printing | Cover Printer | No | No | No | No |
| Folding/cutting Book Block | Folder equipment | Yes | Yes | Yes | No |
| Lamination | Lamination equipment | Yes | No | Yes | No |
| Cover trimming | Cover trimmer | Yes | No | Yes | No |
| Binding | Perfect binder | Yes | Yes | Yes | No |

TABLE 1-continued

| Process | Equipment | Incoming product dimensions (for books) and effect on setup time | | Outgoing product dimensions (for books) and effect on setup time | |
|---|---|---|---|---|---|
| | | Height and width | Thickness | Height and width | Thickness |
| Trimming | 3-knife trim | Yes | No | Yes | No |
| Hole drilling | 3-hole drill | Yes | No | No | No |

The scheduling of jobs by the scheduling module 108 taking into consideration the correlation in table 1 is explained in detail with reference to the following example. Consider a book binder on which the manufacturing jobs for a book are to be scheduled. The dimensions of the final products to be manufactured, i.e., the order parameters, in the order of (length*width*thickness), are: for book 1—(19*24*9), for book 2—(19*24*19), for book 3—(17*25*9), for book 4—(17*25*19), and for book 5—(117*125*9), all the dimensions being measured in centimeters (cm).

In such a case, the scheduling module 108 first determines the intermediate product expression for each manufacturing equipment set under consideration and then determines the product dimensions of the intermediate product of each of the books above. In said example, the scheduling module 108 can determine the intermediate products to have the following dimensions in the order of length*width*thickness, all the dimensions measured in centimeters (cm):

Book 1—(21*27*10); book 2—(21*27*21); book 3—(21*27*10); book 4—(21*27*21); and book 5—(151*143*10).

In the above case, the scheduling module 108 can determine from table 1 that for the binder equipment and the folder/cutter equipment, the setup time is dependent on the thickness of the intermediate products. Accordingly, in such a case, the scheduling module 108 can schedule the jobs for producing the books based on the thickness of the intermediate product of each book. Therefore, in the above case, the scheduling module 108 can schedule the book manufacturing jobs in the order of book 2 followed by book 4, book 1, book 5, and book 3, to optimize the production based on the setup time.

In addition, in few other cases, the correlation of the scheduling criterion with the intermediate products may be provided as an expression instead. For such a case, consider an example where the 3-hole drill that has short drill length for drilling holes in a thick book. Therefore in such a case, the setup time involves replacement of the drill in a spindle of the 3-hole drill. Such a situation can be depicted by the following expression made up of order parameters and capability attributes of the 3-hole drill, as an example:

Book thickness>max_drill_hole_length?
setuptime=40:setuptime=10.

The above expression indicates that when the book thickness is greater than the maximum length of the drill hole, then the setup time is 40 seconds; otherwise, the setup time is 10 seconds. Therefore, the above expression depicting the correlation between the scheduling criterion and the product dimensions of the intermediate product captures the dependence of the setup time on the thickness of intermediate products in the process of book manufacturing.

Further, in the above example, taking into account position and pattern of the drill holes in the book block received at the 3-hole drill, consider that the 3-hole drill of the manufacturing equipment set can form three different hole-patterns on the entire variety of book blocks that are received. As a spine length of the book block changes from about 5 inches to 11 inches, the hole-pattern and position also changes. For instance, if the spine length ranges between about 5 and 7 inches then the 3-hole drill forms two holes spaced about 4 inches apart; in case the spine length is between about 7 inches and 9 inches, then the 3-hole drill forms three holes spaced about 3 inches apart; and in case the spine length is about 9 inches to 11 inches then the 3-hole drill forms three holes spaced about 4 inches apart.

Therefore, in such circumstances, in case the setup time is the scheduling criterion for planning the scheduling of books, the scheduling module 108 can also take into consideration position and pattern of holes, i.e., the secondary scheduling criterion. Accordingly, the scheduling module 108 can determine the setup times involved in various combinations of sequencing of manufacturing jobs and can plan the scheduling of jobs in order to optimize the setup time.

For instance, in the above example, during manufacturing of books, when the spine length changes from 6 inches to 8 inches, the scheduling module 108 can determine that changing the drills from 2 spindles to 3 spindles can take around 20 seconds and changing spacing between the spindles from 3 inches to 4 inches can take around 60 seconds. When both the processes occur in series, for planning the scheduling of jobs, the scheduling module 108 can determine that with such a change, the overall setup time involved is around 80 seconds. Further, in case, the spine length changes from 6 inches to 10 inches, the scheduling module 108 can determine that the changing of drills from 2 spindles to 3 takes around 20 seconds and the spacing is not to be changed. Therefore, in such a case, the scheduling module 108 the setup time is about seconds. In addition, in case the spine length changes from 8 inches to 10 inches, the scheduling module 108 determines that the number of spindles is not to be changed and the spindle spacing is to be changed from 3 inches to 4 inches which will take around 60 seconds. Therefore, in this case, the scheduling module 108 determines that the setup time to be about 60 seconds.

Taking into consideration the above determined setup times, the scheduling module 108 can schedule the manufacturing jobs for manufacturing the books accordingly. For instance, the scheduling module 108 can schedule first the book blocks having the spine length of 6 inches to be drilled first, followed by the book blocks having the spine length of 8 inches, and lastly, the holes are drilled in the book blocks having the spine length of 10 inches. In said example, the above mentioned dimensions of the spine length are the product dimensions of the intermediate product, i.e., the book block, of the books to be manufactured.

Once the scheduling of the manufacturing jobs is planned, the performance estimation module 116 can provide for selection of one of the manufacturing equipment sets from the plurality of sets under consideration. In an example, the performance estimation module 116 can estimate financial and production performance of each manufacturing equipment set based on the planned schedule of manufacturing jobs for each equipment set. Further, based on the estimated financial performance, production performance, or both, the performance estimation module 116 can select the manufacturing equipment set to be used for manufacturing. For instance, the selected option can be provided to the user or the manufacturer for further achieving manufacturing on the selected manufacturing equipment set.

As an example, as part of assessment of the production performance, the performance estimation module 116 can determine the production of each manufacturing equipment set in terms of products manufactured per year, compare the estimated production to expected throughput, average slack which is a ratio of actual time taken to time expected time, and percentage of cases where the products are delivered on time. In addition, as part of the production performance estimation, the performance estimation module 116 can determine granular processes, such as in case of book manufacturing, the performance estimation module 116 can take into consideration the average number of sheets per book that is manufactured.

Further, in an example, as part of estimation of financial performance, for each manufacturing equipment set, the performance estimation module 116 can estimate, for example, annual production cost, annual late charges that may be incurred due to delay in manufacturing, annual revenues, annual profits, and return on capital investment.

In addition, as mentioned earlier, in another case, the scheduling system 100 can schedule the manufacturing jobs in real-time, in the same manner as explained above. In such a case, the scheduling system 100 can be coupled to the manufacturing equipment set on which the manufacturing jobs are to be scheduled. In an example, every time a manufacturing job is received, the dimension determining module 106 can obtain the production attributes associated with the manufacturing equipment set for which the scheduling of jobs is to be achieved and on which the product is to be manufactured. Based on the production attributes, the dimension determining module 106 can ascertain the intermediate product expression for the manufacturing equipment set and accordingly determine the product dimension of the intermediate product of the product to be manufactured. In addition, the dimension determining module 106 can obtain the order parameters in real-time to determine the product dimensions of the intermediate product in real-time. Accordingly, the scheduling module 108 can schedule the manufacturing jobs, based on the dimensions of the manufacturing jobs received in real-time. In other words, as a manufacturing job for manufacturing a product is received, the dimension determining module 106 can reschedule the manufacturing jobs already scheduled to accommodate the present manufacturing job on the manufacturing equipment set, for high productivity. Therefore, the scheduling module 108 can achieve the scheduling of manufacturing of jobs at run-time, in the same manner as described above.

In addition, in such a case also, the performance estimation module 116 can determine the performance of the manufacturing equipment set in real-time, and accordingly, the performance estimation module 116 can identify the processes in the process flow or the equipment in the manufacturing equipment set which may be adversely affecting productivity. Accordingly, the user can use the information for adjusting or modifying machines or components of the manufacturing equipment set and the processes in order to achieve high productivity.

Figure 2:
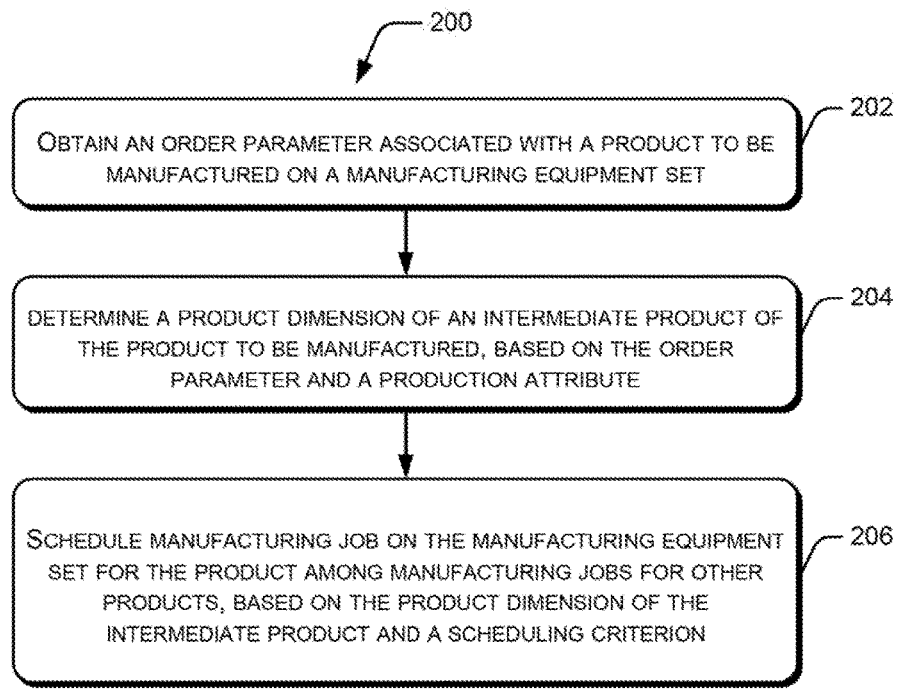
FIG. 2 illustrates a method for scheduling manufacturing jobs, according to an example of the present subject matter.
Figure 3:
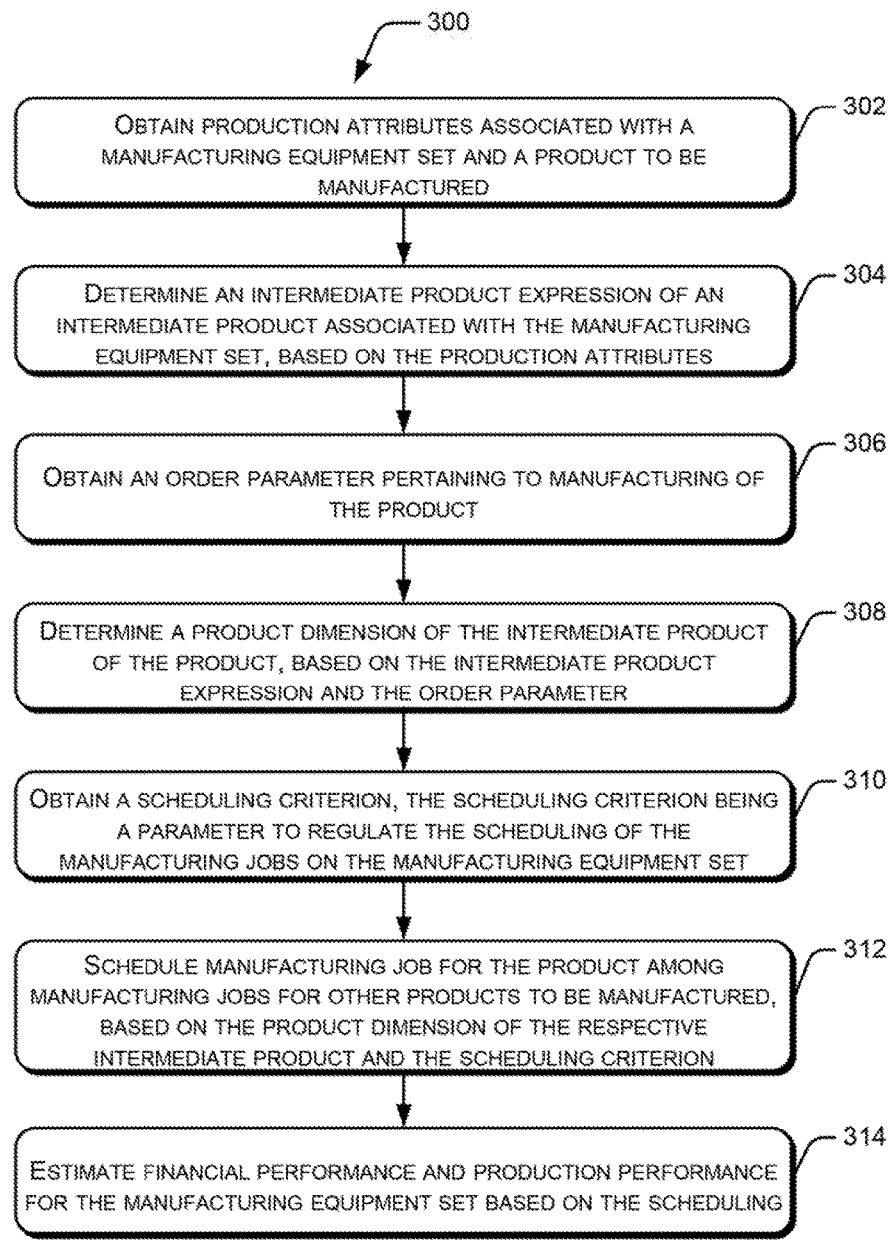
FIG. 3 illustrates a detailed method for scheduling manufacturing jobs, according to an example of the present subject matter.

Methods 200 and 300 are described in FIG. 2 and FIG. 3, respectively, for scheduling manufacturing jobs, according to an example of the present subject matter. While FIG. 2 illustrates an overview of the method 200 for scheduling manufacturing jobs, FIG. 3 illustrates a detailed method 300 for scheduling manufacturing jobs.

The order in which the methods 200 and 300 are described is not intended to be construed as a limitation, and any number of the described method blocks can be combined in any appropriate order to implement the methods 200 and 300 or an alternative method. Additionally, individual blocks may be deleted from the methods 200 and 300 without departing from the spirit and scope of the subject matter described herein.

The methods 200 and 300 can be performed by programmed computing devices, for example, based on instructions retrieved from non-transitory computer readable media. The computer readable media can include machine-executable or computer-executable instructions to perform all or portions of the described method. The computer readable media may be, for example, digital memories, magnetic storage media, such as a magnetic disks and magnetic tapes, hard drives, or optically readable data storage media.

Referring to FIG. 2, the method 200 may be performed by a computing system, such as the scheduling system 100.

At block 202, an order parameter associated with a product to be manufactured on a manufacturing equipment set is obtained. In an example, the order parameter can be details received from the customer regarding customization of the product and can include specification of the finished product to be manufactured. In an example, the dimension determining module 106 can obtain the order parameter.

At block 204, a product dimension of an intermediate product of the product is determined, based on an order parameter(s) and a production attribute. The intermediate product can be an intermediate stage of the product during manufacturing which can affect the overall manufacturing process of the product and the product dimension can be the dimensional attribute associated with the intermediate product which affects the productivity of the manufacturing equipment set. The order parameters can be the details received from the customer regarding customization of the product. For example, the order parameters can be dimensions of the finished product to be manufactured. Further, the production attribute can be attributes associated with the manufacturing equipment set and the product to be manufactured and can include equipment specification, product type to be manufactured, and manufacturing process to be used for manufacturing the product. In an example, the dimension determining module 106 can determine the product dimensions of the intermediate products.

At block 206, the manufacturing jobs are scheduled for production on the manufacturing equipment set for the product, based on the product dimension of the intermediate product and a scheduling criterion. The manufacturing job for manufacturing the product is scheduled along with the manufacturing jobs for other products to be manufactured. Further, the scheduling criterion can be a parameter on the basis of which the scheduling and manufacturing of the products is to be optimally achieved. For instance, the scheduling criterion can include a setup time associated with the different stages or machines in the manufacturing equipment set, a processing time for each stage, and a deadline for completing production of a product. In an example, the scheduling module 108 can obtain the scheduling criterion from a user or may employ a previously used scheduling criterion stored in the optimization data 124, and schedule the manufacturing job.

Referring to FIG. 3, the method 300 may be performed by a computing unit, such as the scheduling system 100.

At block 302, production attributes associated with a manufacturing equipment set and the product to be manufactured are obtained, according to an example. In another example, in which the manufacturing is to be planned and one manufacturing equipment set is to be selected from among a plurality of manufacturing equipment sets, the production attributes can be obtained for each of the plurality of manufacturing equipment sets. In an example, the dimension determining module 106 can obtain the production attributes.

At block 304, an intermediate product expression associated with intermediate product for the manufacturing equipment set is determined based on the production attributes, in one example. In accordance the other example above, the intermediate product expression associated with the intermediate products is determined for each of the plurality of manufacturing equipment sets. The intermediate product expression can be a mathematical relation which is indicative of a relationship between the various production attributes and dependence of dimensions of the intermediate product on the production attributes. For instance, the dimension determining module 106 can determine the intermediate product expression.

At block 306, the order parameter pertaining to the manufacturing of a product is obtained for the product to be manufactured. In an example, the dimension determining module 106 can obtain the order parameter.

At block 308, the product dimension of the intermediate product of the product to be manufactured is determined based on the intermediate product expression and the order parameter.

At block 310, the scheduling criterion based on which the manufacturing of the product is to be optimally scheduled is obtained.

At block 312, the manufacturing job for manufacturing the product is scheduled on the manufacturing equipment set, based on the product dimension of the intermediate product and the scheduling criterion. In another example, the manufacturing job is scheduled on each of the plurality of manufacturing equipment sets under consideration for selection. The scheduling of the manufacturing job for the product can be achieved to queue the product along with other products to be manufactured on the manufacturing equipment set. In an example, genetic optimization techniques, simulated annealing techniques, or a combination of linear optimization approaches can be employed for scheduling the manufacturing jobs.

At block 314, a performance of the manufacturing equipment set is estimated based on the scheduling of the manufacturing jobs. For instance, based on the scheduling of jobs, financial and production performance of the manufacturing equipment set can be estimated. In the other example, the performance of each of the manufacturing equipment sets under consideration for selection can be estimated. Further, in accordance with an aspect, one manufacturing equipment set can be selected from among the plurality, based on the performance, for example, financial performance, production performance, or both. Accordingly, based on the planned scheduling, and in the other case, based on the selected manufacturing equipment set, the products can be manufactured. In an example, the performance estimation module 116 can estimate the performance of the manufacturing equipment set and, in one case, based on the performance, can select a manufacturing equipment set to be used for production.

Figure 4:
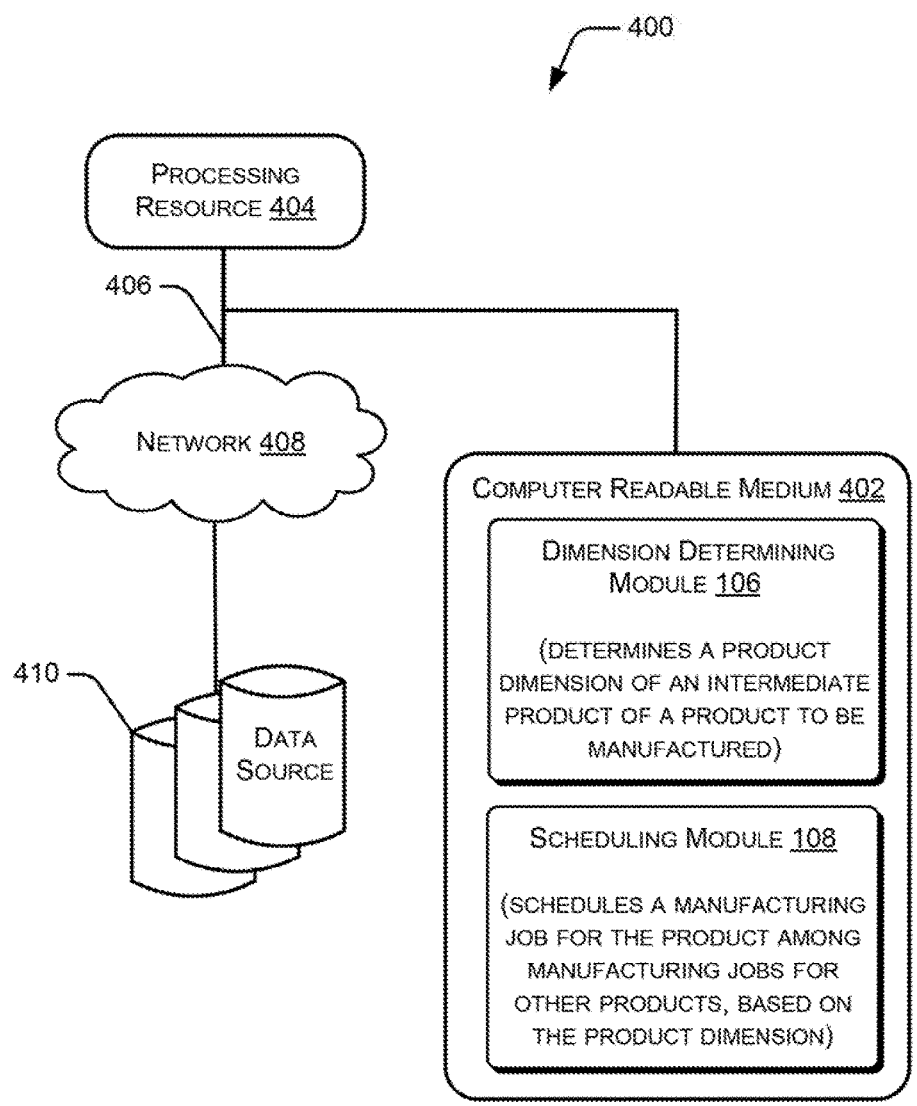
FIG. 4 illustrates a computer readable medium storing instructions to perform scheduling of manufacturing jobs, according to an example of the present subject matter.

FIG. 4 illustrates an example network environment 400 implementing a non-transitory computer readable medium 402 for scheduling manufacturing jobs, according to an example of the present subject matter. The network environment 400 may be a public networking environment or a private networking environment. In one implementation, the network environment 400 includes a processing resource 404 communicatively coupled to the non-transitory computer readable medium 402 through a communication link 406.

For example, the processing resource 404 can be a processor of a computing system, such as the scheduling device 100. The non-transitory computer readable medium 402 can be, for example, an internal memory device or an external memory device. In one implementation, the communication link 406 may be a direct communication link, such as one formed through a memory read/write interface. In another implementation, the communication link 406 may be an indirect communication link, such as one formed through a network interface. In such a case, the processing resource 404 can access the non-transitory computer readable medium 402 through a network 408. The network 408 may be a single network or a combination of multiple networks and may use a variety of communication protocols.

The processing resource 404 and the non-transitory computer readable medium 402 may also be communicatively coupled to data sources 410 over the network 408. The data sources 410 can include, for example, databases and computing devices. The data sources 410 may be used by the database administrators and other users to communicate with the processing resource 404.

In one implementation, the non-transitory computer readable medium 402 includes a set of computer readable instructions, such as the dimension determining module 106 and the scheduling module 108. The set of computer readable instructions, referred to as instructions hereinafter, can be accessed by the processing resource 404 through the communication link 406 and subsequently executed to perform acts for network service insertion.

For discussion purposes, the execution of the instructions by the processing resource 404 has been described with reference to various components introduced earlier with reference to description of FIGS. 1A and 1B.

On execution by the processing resource 404, the dimension determining module 108 identifies an intermediate stage of a manufacturing equipment set based on an effect of the intermediate stage on manufacturing of the product. Further, the dimension determining module 106 ascertains a product dimension of an intermediate product in the identified intermediate stage, for a product to be manufactured on a manufacturing equipment set, based on an order parameter and a production attribute. As explained previously, the intermediate product can be one of the intermediate stages of the product during manufacturing and can affect the overall manufacturing process of the product. The intermediate product can vary for each product, manufacturing process, and manufacturing equipment set.

Further, the scheduling module 108 can schedule the manufacturing jobs for the product along with the manufacturing jobs for other products to be manufactured, on the manufacturing equipment set, based on the product dimension of the intermediate product and a scheduling criterion. The scheduling criterion can be the parameter based on which the scheduling of the product is to be achieved and optimized, and can include, for example, setup time, processing time, and a deadline for manufacturing the products.

Although implementations for scheduling of manufacturing jobs have been described in language specific to structural features and/or methods, it is to be understood that the appended claims are not necessarily limited to the specific features or methods described. Rather, the specific features and methods are disclosed as example implementations for scheduling of manufacturing jobs.

We claim:

1. A computer implemented method for scheduling manufacturing jobs, the method comprising:
    obtaining, by a processor, at least one order parameter associated with a product to be manufactured;
    determining, by the processor, a plurality of product dimensions of an intermediate product of the product to be manufactured, based on the at least one order parameter and a production attribute;
    selecting, by the processor, a manufacturing equipment set from a plurality of different manufacturing equipment sets based on a production performance and a financial performance of each one of the plurality of different manufacturing equipment sets; and
    scheduling, by the processor, a manufacturing job for the product among manufacturing jobs for other products to be manufactured on the manufacturing equipment set that is selected, based on at least one product dimension of the plurality of product dimensions of the intermediate product that affect a setup time for the manufacturing equipment set that is selected and a scheduling criterion, wherein the scheduling criterion is a parameter to regulate the scheduling of the manufacturing jobs on the manufacturing equipment set.

2. The method as claimed in claim 1, wherein the determining comprises ascertaining an intermediate product expression for the manufacturing equipment set, based on the production attribute, wherein the plurality of product dimensions of the intermediate product is determined based on the intermediate product expression.

3. The method as claimed in claim 1, wherein the scheduling criterion comprises at least one of setup time, processing time, and a delivery deadline.

4. The method as claimed in claim 1, wherein the production attribute comprises an equipment specification.

5. A scheduling system for scheduling manufacturing jobs, the scheduling system comprising:
    a processor;
    a dimension determining module coupled to the processor to determine a plurality of product dimensions of an intermediate product for a product to be manufactured, based on at least one order parameter associated with the product and at least one production attribute;
    a performance estimation module coupled to the processor to determine a production performance and a financial performance of each of a plurality of different manufacturing equipment sets and to select a manufacturing equipment set from the plurality of different manufacturing equipment sets based on the production performance and the financial performance of each one of the plurality of different manufacturing equipment sets; and
    a scheduling module coupled to the processor to schedule the manufacturing job for the product among manufacturing jobs for other products on the manufacturing equipment set, based on at least one product dimension of the plurality of product dimensions of the intermediate product that affect a setup time for the manufacturing equipment set that is selected and a scheduling criterion, wherein the scheduling criterion regulates a manner of scheduling the manufacturing jobs on the manufacturing equipment set.

6. The scheduling system as claimed in claim 5, wherein the dimension determining module ascertains an intermediate product expression for a manufacturing equipment set, based on the at least one production attribute, wherein the dimension determining module determines the plurality of product dimensions of the intermediate product based on the intermediate product expression for manufacturing the product on the manufacturing equipment set.

7. The scheduling system as claimed in claim 6, wherein the scheduling module schedules the manufacturing job on the manufacturing equipment set, based on the plurality of product dimensions of the intermediate product for the product on each of the plurality of manufacturing equipment sets.

8. The scheduling system as claimed in claim 5, wherein the production attribute comprises a run-time production attribute, the scheduling module scheduling the manufacturing jobs in real-time based on the run-time production attribute.

9. A non-transitory computer-readable medium comprising instructions executable by a processing resource to:
   identify an intermediate stage of a manufacturing equipment set, based on an effect of the intermediate stage on production of a product to be manufactured;
   obtain at least one order parameter associated with the product to be manufactured;
   ascertain a plurality of product dimensions of an intermediate product of the product in the intermediate stage, based on the at least one order parameter and a production attribute;
   select a manufacturing equipment set from a plurality of different manufacturing equipment sets based on a production performance and a financial performance of each one of the plurality of different manufacturing equipment sets; and
   schedule manufacturing jobs for the product among manufacturing jobs for other products on the manufacturing equipment set, based on the at least one product dimension of the plurality of product dimensions of the intermediate product that affect a setup time for the manufacturing equipment set that is selected and a scheduling criterion.

10. The non-transitory computer-readable medium as claimed in claim 9, wherein the non-transitory computer-readable medium further comprises instructions executable by the processor to determine an intermediate product expression each for a plurality of manufacturing equipment set for manufacturing the product, based on the production attribute and the identified intermediate stage, wherein the plurality of product dimension of the intermediate product is ascertained for each of the plurality of manufacturing equipment set based on the intermediate product expression.

11. The non-transitory computer-readable medium as claimed in claim 9, wherein the scheduling criterion comprises at least one of setup time, processing time, and a delivery deadline.

12. The non-transitory computer-readable medium as claimed in claim 9, wherein the production attribute comprises an equipment specification.

\* \* \* \* \*